United States Patent
Moon

(10) Patent No.: US 12,494,894 B2
(45) Date of Patent: Dec. 9, 2025

(54) HOMOMORPHIC ENCRYPTION ARITHMETIC DEVICE AND OPERATING METHOD THEREOF

(71) Applicant: SAMSUNG ELECTRONICS CO., LTD., Suwon-si (KR)

(72) Inventor: Youngsik Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 18/643,631

(22) Filed: Apr. 23, 2024

(65) Prior Publication Data

US 2025/0015970 A1 Jan. 9, 2025

(30) Foreign Application Priority Data

Jul. 6, 2023 (KR) .......................... 10-2023-087988

(51) Int. Cl.
| | |
|---|---|
| *H04L 9/14* | (2006.01) |
| *G06F 21/31* | (2013.01) |
| *G06F 21/62* | (2013.01) |
| *H04L 9/00* | (2022.01) |
| *G06F 21/45* | (2013.01) |
| *H04L 9/30* | (2006.01) |

(52) U.S. Cl.
CPC .......... *H04L 9/008* (2013.01); *G06F 21/6218* (2013.01)

(58) Field of Classification Search
None
See application file for complete search history.

(56) References Cited

U.S. PATENT DOCUMENTS

| | | |
|---|---|---|
| 9,509,492 B2 | 11/2016 | Smyth et al. |
| 10,554,390 B2 | 2/2020 | Jain et al. |
| 11,343,100 B2 | 5/2022 | Narumanchi et al. |

(Continued)

FOREIGN PATENT DOCUMENTS

| | | |
|---|---|---|
| CN | 114357418 | 4/2022 |
| CN | 114357418 A * | 4/2022 |

(Continued)

OTHER PUBLICATIONS

Efficient Privacy-Preserving Fingerprint-Based Authentication System Using Fully Homomorphic Encryption. Kim. Wiley. (Year: 2020).*

(Continued)

*Primary Examiner* — Venkat Perungavoor
(74) *Attorney, Agent, or Firm* — Morgan, Lewis & Bockius LLP

(57) ABSTRACT

Provided are a homomorphic encryption arithmetic device and an operating method thereof. Provided is an operating method of a homomorphic encryption arithmetic device, the operating method including receiving, from a client, a public key and an input identification value, generating an authenticator on the basis of a result of comparing an input identification value with a plurality of user identification values stored in a first database, obtaining a search result value by searching a second database on the basis of an input query, generating an arithmetic result value by performing an operation by using the search result value and the authenticator, and transmitting the arithmetic result value to the client.

20 Claims, 10 Drawing Sheets

(56) References Cited

U.S. PATENT DOCUMENTS

| | | |
|---|---|---|
| 11,546,164 B2 | 1/2023 | Badrinarayanan et al. |
| 11,595,210 B2 | 2/2023 | Hoang |
| 2015/0227930 A1* | 8/2015 | Quigley ............... H04L 9/3013 705/72 |
| 2021/0367786 A1* | 11/2021 | Sheets .................. H04L 9/0894 |
| 2022/0286301 A1* | 9/2022 | Omori .................... G06F 21/31 |
| 2023/0123579 A1* | 4/2023 | Panikkar .............. H04L 9/0822 713/189 |
| 2023/0146149 A1 | 5/2023 | Moon et al. |

FOREIGN PATENT DOCUMENTS

| | | | |
|---|---|---|---|
| CN | 115730342 A * | 3/2023 | |
| KR | 10-2021-0084828 | 7/2021 | |
| WO | 2021144842 | 7/2021 | |
| WO | WO-2021144842 A1 * | 7/2021 | ............... H04L 9/32 |

OTHER PUBLICATIONS

A Resource Efficient Software-Hardware Co-Design of Lattice-Based Homomorphic Encryption Scheme on the FPGA. Paul. IEEE. (Year: 2023).*

* cited by examiner

HOMOMORPHIC ENCRYPTION ARITHMETIC DEVICE AND OPERATING METHOD THEREOF

CROSS-REFERENCE TO RELATED APPLICATION

This application is based on and claims priority under 35 U.S.C. § 119 to Korean Patent Application No. 10-2023-0087988, filed on Jul. 6, 2023, in the Korean Intellectual Property Office, the disclosure of which is incorporated by reference herein in its entirety.

BACKGROUND

The inventive concept relates to a homomorphic encryption operating method and, particularly, to an apparatus for processing data of a user by using an anonymous signature protocol based on homomorphic encryption, and an operating method thereof.

With the development of communication technology and the active spread of electronic devices, efforts to maintain communication security between electronic devices are continuously being made, and accordingly, encryption/decryption technologies are used in most communication environments.

When a message encrypted by encryption technology is delivered to another party, the other party decrypts the encrypted message to read the initial, unencrypted message. In this manner, when hacking by a third party occurs during the period that the other party has temporarily decrypted the message for an operation, the decrypted message may be easily leaked to the third party.

To address this problem, homomorphic encryption methods are being investigated. With homomorphic encryption, even if the encrypted information is not decrypted and an operation is performed in the ciphertext state, the same result as the encrypted value may be obtained after the operation is performed for the plaintext. Accordingly, various operations may be performed without decrypting the ciphertext.

SUMMARY

Principles and embodiments of the inventive concept relate to a homomorphic encryption operating method and a system that provides security and reliability using encrypted authenticators.

The principles and embodiments of the inventive concept are not limited to the various aspects described above, and other aspects and details not mentioned may be clearly understood by a person skilled in the art from the following description.

According to an aspect of the inventive concept, there is provided an operating method of a homomorphic encryption arithmetic device, the operating method including receiving, a public key and an encrypted input identification value based on the public key, generating an authenticator based on a result of comparing the input identification value with a plurality of user identification values, obtaining a search result on the basis of an input query received from the client, generating an arithmetic result value by using the search result value and the authenticator, and transmitting the arithmetic result value to a client.

According to another aspect of the inventive concept, there is provided a homomorphic encryption arithmetic device including a memory including a first database configured to store a plurality of user identification values and a second database configured to store a plurality of field values, an authenticator generator configured to receive a public key and an encrypted input identification value based on the public key, and configured to generate an authenticator based on a result of comparing the input identification value with the plurality of user identification values, and an arithmetic device configured to obtain a search result value by searching the second database on the basis of an input query to obtain an arithmetic result value by performing an operation using the search result value and the authenticator, and to transmit the arithmetic result value to a client.

According to another aspect of the inventive concept, there is provided a non-transitory computer-readable storage medium storing commands that cause a processor to perform homomorphic encryption operations when executed by the processor, the processor configured to receive, from a client, a public key and an encrypted input identification value based on the public key, generate an authenticator on the basis of a result of comparing an input identification value with a plurality of user identification values stored in a first database, obtain a search result by searching a second database on the basis of an input query received from the client, generate an arithmetic result value by performing an operation by using the search result value and the authenticator, and transmit the arithmetic result value to the client.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
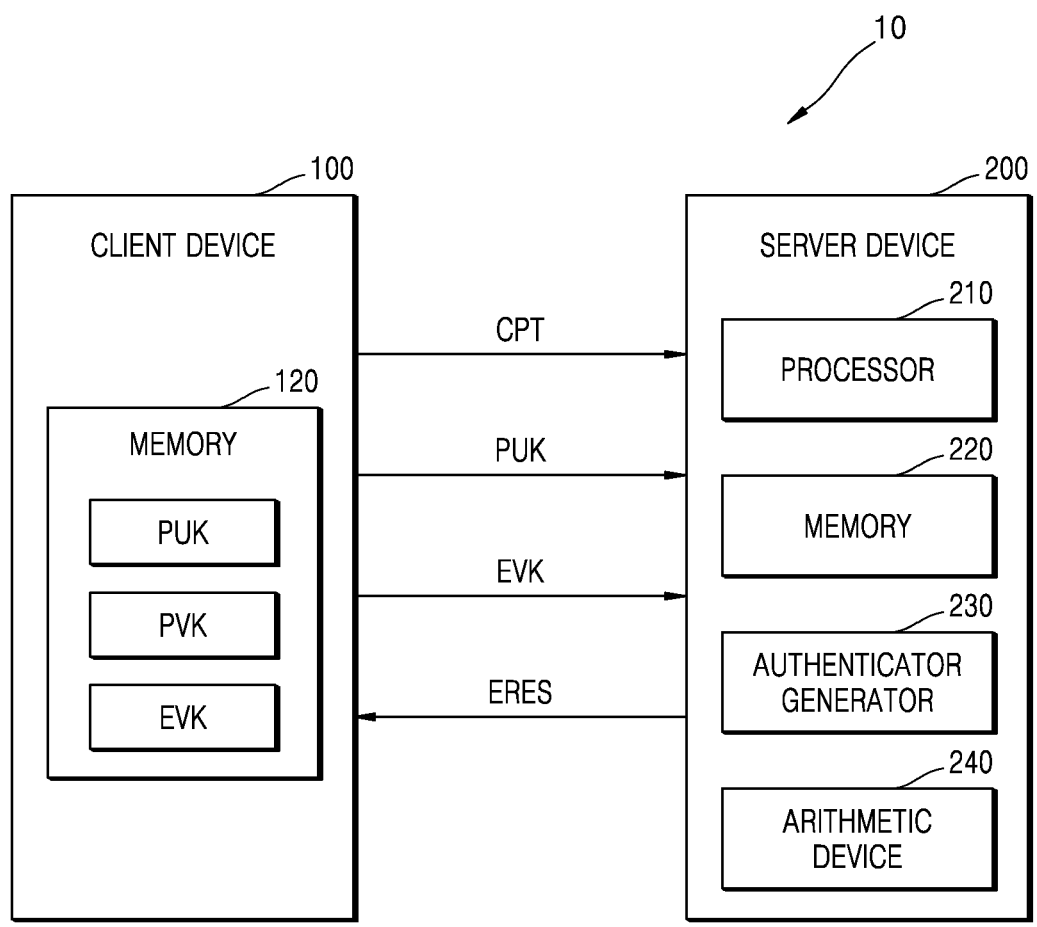
FIG. 1 is a block diagram illustrating a system according to an embodiment.

Embodiments are described in detail with reference to the accompanying drawings, where the same or corresponding components are assigned the same reference numerals, and redundant descriptions thereof may be omitted.

FIG. 1 is a block diagram illustrating a system 10 according to an embodiment.

Referring to FIG. 1, the system 10 may include a client device 100 and a server device 200. The system 10 may be referred to as a homomorphic encryption-based authentication system. In the present specification, the client device 100 may be referred to as a first homomorphic encryption device, or may be referred to as a client. The server device 200 may be referred to as a second homomorphic encryption device or a homomorphic encryption arithmetic device, or may be referred to as a server.

In various embodiments, the client device 100 may encrypt data transmitted to the server device 200 through a homomorphic encryption algorithm, where initially unencrypted data may be encrypted by the client device 100 using the homomorphic encryption algorithm. The client device 100 may generate a public key PUK, a private key PVK, and an evaluation key EVK. The client device 100 may include a memory 120, where the memory 120 may be configured to store the public key PUK, private key PVK, and evaluation key EVK generated by the client device 100. In an embodiment, the client device 100 may generate a ciphertext CPT by encrypting a plain text according to a homomorphic encryption algorithm. The ciphertext CPT may be data obtained by encrypting a plain text by using the public key PUK.

In various embodiments, the public key PUK, private key PVK, and/or evaluation key EVK stored in the memory of the client device may be utilized to encrypt plain text to obtain ciphertext CPT for transmission to a server device 200. The ciphertext CPT may be an encrypted query.

In various embodiments, the client device 100 may transmit, to the server device 200, at least one key and the ciphertext CPT. In an embodiment, the ciphertext CPT may include information identifying a user of the client device 100. The information identifying a user may refer to, for example, the user's identification (ID) and password, fingerprint information, and/or iris information, and may refer to other data that may identify the user. As used herein, information identifying a user may be referred to as a user identification value, and a user identification value included in a ciphertext CPT may be referred to as an input user identification value or input identification value.

In an embodiment, the key transmitted by the client device 100 to the server device 200 may include a public key PUK and an evaluation key EVK.

In an embodiment, the ciphertext CPT may be a query generated by the client device 100 to obtain data from the database of the server device 200. The query may be a query encrypted by the public key PUK generated by the client device 100.

In an embodiment, the client device 100 may transmit an unencrypted query to the server device 200 to obtain data from the database of the server device 200.

In various embodiments, the client device 100 may receive an arithmetic result value ERES from the server device 200. The client device 100 may decrypt the arithmetic result value ERES by using the private key PVK, where the decryption result may be a value corresponding to a query provided by the client device 100 or a dummy value not related to the query provided by the client device 100, according to the ciphertext CPT delivered to the server device 200 by the client device 100. A detailed description of the decryption result will be described later with reference to FIGS. 3 and 4.

In various embodiments, the server device 200 may perform an operation using the ciphertext CPT received from the client device 100, where the server device 200 may process the ciphertext CPT by performing an operation on the ciphertext CPT. The operation may be, for example, an addition operation, a multiplication operation, an approximation operation, or a comparison operation, where the operation refers to an operation according to a homomorphic encryption algorithm. The server device 200 may maintain security of user data by performing an encryption operation on the user data based on a homomorphic encryption algorithm.

In various embodiments, the server device 200 may include a processor 210, a memory 220, an authenticator generator 230, and an arithmetic device 240, where for example, the server device 200 may be a computing system such as a personal computer, a mobile phone, a server, etc., and may be a module in which a plurality of processing cores and memory are mounted on a substrate as independent packages, and the plurality of processing cores and memory may be a system-on-chip embedded in one chip.

In various embodiments, the processor 210 may communicate with the memory 220 and execute instructions. In various embodiments, the processor 210 may execute a program stored in the memory 220. The program may include a series of instructions. The processor 210 may be hardware capable of independently executing instructions, and may be referred to as an Application Processor (AP), a Communication Processor (CP), a Central Processing Unit (CPU), a processor core, a core, and the like.

In various embodiments, the processor 210 and the memory 220 may communicate with each other. The memory 220 may be accessed by the processor 210 and may store software elements executable by the processor 210. The software element(s) may include, by way of a non-limiting example, a software component, program, application, computer program, application program, system program, software development program, machine program, operating system (OS) software, middleware, firmware, software module, routine, subroutine, function, method, procedure, software interface, application program interface (API), instruction set, computing code, computer code, code segment, computer code segment, compiler, word, value, symbol, or any combination of two or more thereof.

In various embodiments, the memory 220 may be hardware that may be configured to store information and may be accessed by the processor 210. For example, the memory 220 may include a read only memory (ROM), a random access memory (RAM), a dynamic random access memory (DRAM), a double-data-rate dynamic random access memory (DDR-DRAM), a synchronous dynamic random access memory (SDRAM), a static random access memory (SRAM), a magnetoresistive random access memory (MRAM), a programmable read only memory (PROM), an erasable programmable read only memory (EPROM), an electrically erasable programmable read only memory (EEPROM), a flash memory, a polymer memory, a phase change memory, a ferroelectric memory, a silicon-oxide-nitride-oxide-silicon (SONOS) memory, a magnetic card/disk, an optical card/disk, or any combination of two or more thereof. In an embodiment, the memory 220 may include a first database for storing a plurality of user identification values. In various embodiments, each of a plurality of user identification values stored in the first database may be stored in an encrypted form by a homomorphic encryption algorithm, where the first database may be encrypted. The memory 220 may include a second database for storing field values that are data corresponding to queries received from the client device 100. In various embodiments, the data stored in the second database may be encrypted by a homomorphic encryption algorithm. The memory 220 may include the first database and the second database, where the memory 220 may also include additional databases, such that one or more databases may be stored in a memory 220. In a non-limiting exemplary embodiment, data may be stored as two or more tables in one database, where a plurality of user identification values may be stored in the first table, and a plurality of field values may be stored in the second table.

In various embodiments, the authenticator generator 230 may generate an authenticator based on the user identification value received from the client device 100. The authenticator generator 230 may compare the user identification value included in the ciphertext CPT transmitted from the client device 100 with the plurality of user identification values stored in the first database of the memory 220 of a server 200. The authenticator generator 230 may compare the plurality of user identification values stored in the memory 220 with the user identification value received from the client device 100. The authenticator generator 230 may generate an authenticator having a first value or an authenticator having a second value based on the comparison result. The authenticator generator 230 may provide the authenticator to the arithmetic device 240, where the arithmetic device 240 may be configured to generate an arithmetic result value ERES based on the value of the authenticator. A detailed description of the authenticator generation will be described later with reference to FIGS. 2 and 3.

In various embodiments, the arithmetic device 240 may perform a search of the second database, according to an input query included in the ciphertext CPT received from the client device 100, where a search result value may be obtained by searching a second database 222 on the basis of the input query EQY received from the client. The arithmetic device 240 may generate an arithmetic result value by multiplying the search result value by the authenticator received from the authenticator generator 230. The arithmetic result value ERES may be assigned the search result value, in response to the authenticator having the first value, or the arithmetic result value ERES may be assigned a dummy value, in response to the authenticator having the second value. The arithmetic device 240 may transmit the arithmetic result value ERES to the client device 100. A detailed description of the arithmetic process of the arithmetic device 240 will be described later with reference to FIGS. 2 and 4.

In various embodiments, the homomorphic encryption arithmetic device and the operating method of the homomorphic encryption arithmetic device, according to an embodiment, may be stored in a non-transitory computer-readable storage medium. The term "computer-readable media" may include any type of media that may be accessed by a computer, such as read only memory (ROM), random access memory (RAM), hard disk drives, compact discs (CDs), digital video discs (DVDs), or other types of media. Non-transitory computer-readable media may exclude wired, wireless, optical, or other communication links that transmit temporary electricity or other signals, and may include media capable of storing data permanently, and media capable of storing data and then overwriting data thereon such as rewritable optical disks or erasable memory devices.

Figure 2:
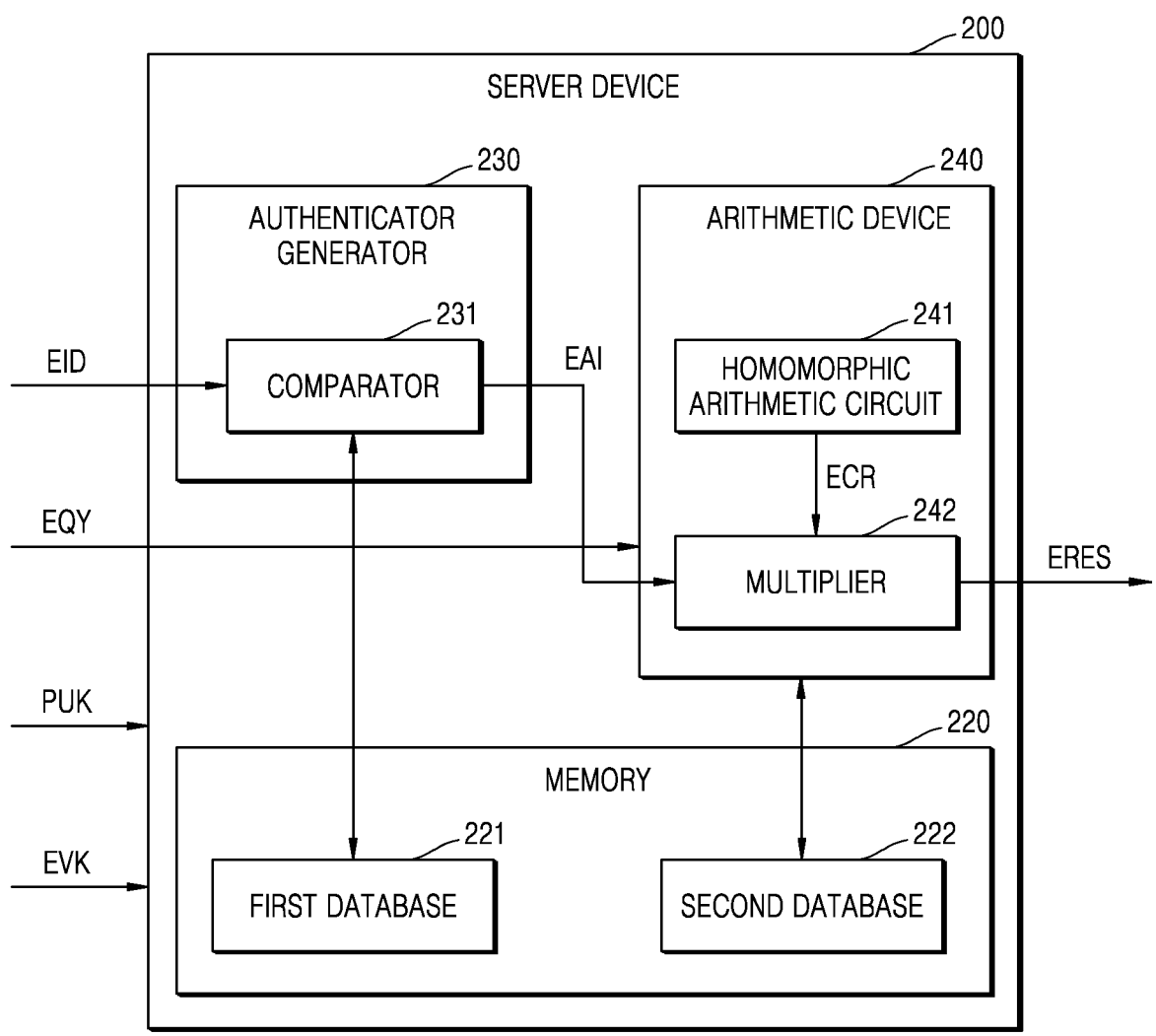
FIG. 2 is a block diagram illustrating a server device according to an embodiment.

FIG. 2 is a block diagram illustrating a server device 200 according to an embodiment. FIG. 2 may be described with reference to FIG. 1, and redundant descriptions may be omitted.

Referring to FIG. 2, the server device 200 may include a memory 220, an authenticator generator 230, and an arithmetic device 240. The memory 220 may include a first database 221 and a second database 222. The first database 221 may be configured to store a user identification value. In an embodiment, the first database 221 may store a plurality of user identification values, where each of the user identification values stored in the first database 221 may be a value encrypted by a homomorphic encryption algorithm.

In various embodiments, the server device 200 may receive a public key PUK and an evaluation key EVK from the client device 100. The received public key PUK and evaluation key EVK may be stored in the memory 220, where the public key PUK and evaluation key EVK may be stored in the second database 222.

In various embodiments, the second database 222 may be configured to store data to be provided to the client device 100, where the second database 222 may be configured to store field values that are result values corresponding to the entry queries received from the client device 100. The second database 222 may store a plurality of field values.

In various embodiments, the authenticator generator 230 may receive the input identification value EID from the client device 100, where the input identification value EID may be a value encrypted by a homomorphic encryption algorithm. For example, the input identification value EID may be a value encrypted by using a public key PUK generated by the client device 100.

In various embodiments, the authenticator generator 230 may include a comparator 231. The authenticator generator 230 may search for a plurality of user identification values stored in the first database 221, and may compare the input identification value EID with a plurality of user identification values stored in the first database 221 using the comparator 231. The authenticator generator 230 may determine whether there is a match between the input identification value EID and the values stored in the first database 221. In various embodiments, the comparator 231 may be referred to as a homomorphic comparator.

In an embodiment, in response to a match between the input identification value EID and at least one of the user identification values stored in the first database 221, the authenticator generator 230 may generate an authenticator EAI with a first value. In an embodiment, in response to no match between the input identification value EID and none of the user identification values stored in the first database 221, the authenticator generator 230 may generate an authenticator EAI with a second value. A detailed description of a process in which the authenticator generator 230 generates the authenticator EAI will be described later with reference to FIG. 3.

In various embodiments, the arithmetic device 240 may include a homomorphic arithmetic circuit 241 and a multiplier 242. The arithmetic device 240 may search for field values stored in the second database 222. The homomorphic arithmetic circuit 241 may perform an operation to compare an input query EQY received from the client device 100 with queries corresponding to the field value stored in the second database 222, and obtain comparison operation result values ECR. The homomorphic arithmetic circuit 241 may provide the comparison operation result values ECR to the multiplier 242. In an embodiment, the client device 100 may generate an input query EQY, and the input query EQY may be encrypted using a public key PUK generated by the client device 100.

As used herein, searching the second database 222 may mean that the arithmetic device 240 performs a series of actions to obtain the search result value. For example, searching the second database 222 may mean that the arithmetic device 240 performs the following two actions: First, the arithmetic device 240 may, via the homomorphic arithmetic circuit 241, perform a comparison operation to determine whether the input query EQY is a query to extract a particular record stored in the second database 222. The result of the comparison operation may be a set of comparison operation result values ECR. A specific description of this will be described later with reference to FIG. 4 and Equation 7. Second, the arithmetic device 240 may obtain a search result value by multiplying the comparison operation result values ECR and the field values corresponding to each comparison operation result values ECR via the multiplier 242 to obtain the search result value. This will be described further with reference to FIG. 4 and Equation 8.

In various embodiments, the multiplier 242 may obtain the search result value by multiplying each of the comparison operation result values ECR received from the homomorphic arithmetic circuit 241 by the field values corresponding to each of the comparison operation result values ECR. The multiplier 242 may obtain the arithmetic result value ERES by multiplying the search result value by the authenticator EAI received from the authenticator generator 230. The arithmetic result value including a field value corresponding to the input query may be generated in response to the authenticator having the first value during decryption by using a private key corresponding to the public key. The arithmetic result value including a dummy value may be generated in response to the authenticator having the second value during decryption by using a private key corresponding to the public key. The multiplier 242 may provide the arithmetic result value ERES to the client device 100. The client device 100 may decrypt the arithmetic result value ERES received from the server device 200 using the private key PVK. In various embodiments, the multiplier 242 may be referred to as a homomorphic multiplier. A detailed description of the multiplication operation of the multiplier 242 and the decryption operation of the arithmetic result value ERES will be described later with reference to FIG. 4.

Figure 3:
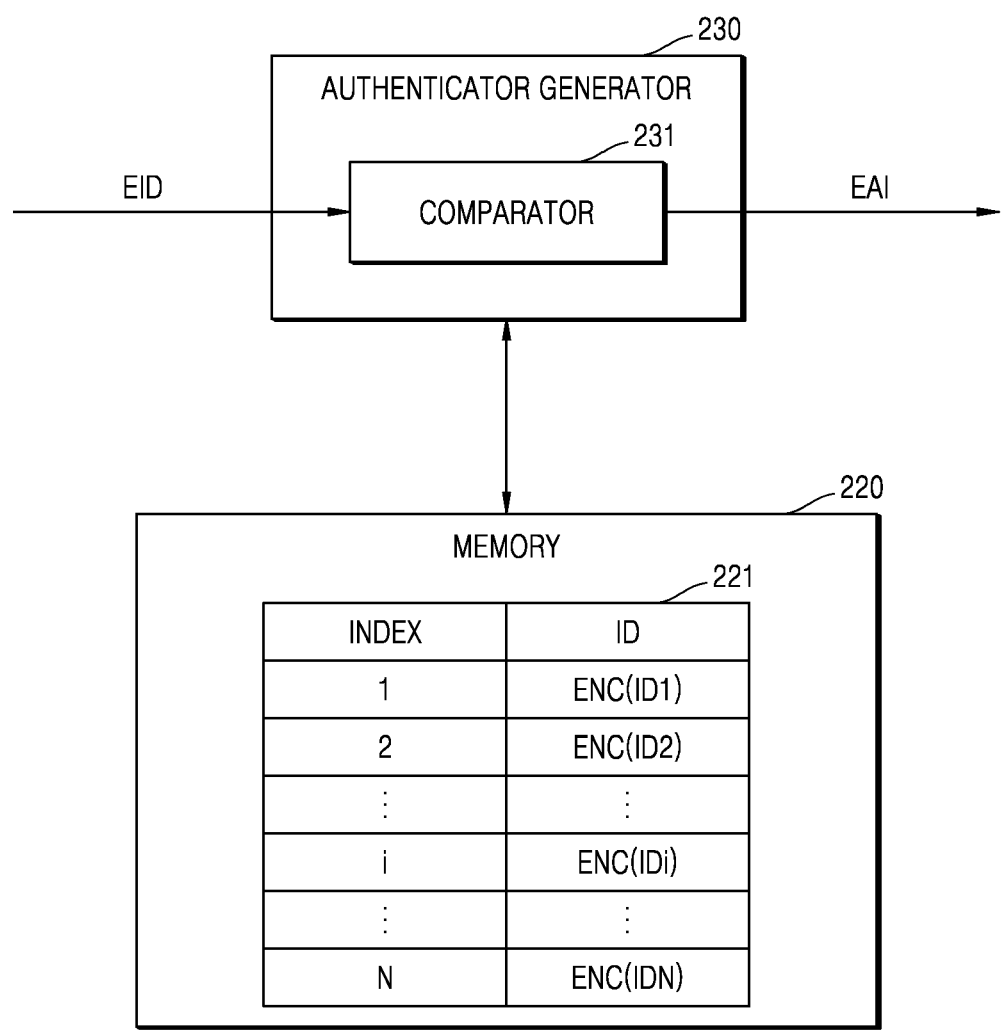
FIG. 3 is a diagram illustrating an operating method of an authenticator generator, according to an embodiment.

FIG. 3 is a diagram illustrating an operating method of an authenticator generator 230 according to an embodiment. FIG. 3 may be described with reference to FIGS. 1 and 2, and redundant descriptions may be omitted.

In various embodiments, the memory 220 may include a first database 221. In an embodiment, the first database 221 may include N records (where N is an integer of 1 or more), including N user identification values ENC(ID1) to ENC(IDN). Each record included in the first database 221 may be classified according to an index value. Each user identification value may be a value encrypted by a homomorphic encryption algorithm. Each user identification value may be a value encrypted through different public keys. Hereinafter, it may be assumed that the input identification value EID is the same value as an i-th user identification value ENC(IDi), which is the i-th user identification value (where i is an integer of 1 or more) among the user identification values included in the first database 221.

In various embodiments, the authenticator generator 230 may include a comparator 231. The authenticator generator 230 may receive the input identification value EID from the client device 100. The authenticator generator 230 may perform a comparison operation on the first database 221 based on the input identification value EID, and may generate an authenticator EAI, that may be a first value or a second value.

In an embodiment, the comparator 231 may perform an operation of comparing the input identification value EID with N user identification values ENC(ID1) to ENC(IDN). The comparison operation of the comparator 231 may be expressed as Equation 1 below.

$$comp(ENC(IDi), ENC(IDj)) = \begin{cases} ENC(1), & \text{if } IDj = IDj \\ ENC(0), & \text{if } IDi \neq IDj \end{cases} \quad \text{[Equation 1]}$$

In various embodiments, the ENC(1) may be referred to as a first value, and the ENC(0) may be referred to as a second value. The first value and the second value may be values encrypted using the public key PUK generated by the client device 100. In an embodiment, the first value may be a value obtained by encrypting integer 1 by using a public key PUK generated by the client device 100, and the second value may be a value obtained by encrypting integer 0 by using a public key PUK generated by the client device 100. In an embodiment, according to the present disclosure, the second value ENC(0) may be an identity element for an addition operation. The first value ENC(1) may be an identity element for a multiplication operation. In other words, the addition operation for the first value ENC(1) and the second value ENC(0) may be operated as shown in Equations 2 and 3 below. In an embodiment, when the server device 200 performs a binary operation, such as an addition operation or a multiplication operation, using the first or second value, a commutative property may be established.

$$ENC(1) + ENC(0) = ENC(1) \quad \text{[Equation 2]}$$

$$ENC(0) + ENC(0) = ENC(0) \quad \text{[Equation 3]}$$

In various embodiments, the comparator 231 may perform a comparison operation such as Equation 1 for each of the first user identification values ENC(ID1) to N-th user identification values ENC(IDN). The comparison operation may be expressed as Equation 4 below.

$$F(ENC(IDi)) = \sum_{j=1}^{N} comp(ENC(IDi), ENC(IDj)) = EAI \quad \text{[Equation 4]}$$

In Equation 4, F (ENC(IDi)) may refer to a function that allows the comparator 231 to receive an input identification value EID as an input value and perform a comparison operation between the input identification value EID and the user identification values stored in the first database 221. The comparator 231 may perform a comparison operation according to Equation 4 and generate an authenticator EAI. The authenticator EAI may be represented by Equation 5.

$$EAI = \begin{cases} ECN(1) + \sum_{\substack{j=1 \\ j \neq i}}^{N} ENC(0), & \text{if } i \in N(\text{verified}) \\ \sum_{j=1}^{N} ENC(0), & \text{else} \end{cases} \quad \text{[Equation 5]}$$

Considering Equations 2 and 3, Equation 5 may be expressed as Equation 6.

$$EAI = \begin{cases} ENC(1), & \text{if } i \in N(\text{verified}) \\ ENC(0), & \text{else} \end{cases} \quad \text{[Equation 6]}$$

The comparator 231 may generate an authenticator EAI having a first value or a second value depending on whether there is a match between the input identification value EID and the user identification values included in the first database 221. Whether the user is an authenticated user or an unauthenticated user may be classified according to a value of the authenticator EAI, where for example, when the authenticator EAI has a first value, this may mean that the user of the client device 100 that has transmitted the input identification value EID is an authenticated user. When the authenticator EAI has a second value, this may mean that the user of the client device 100 that has transmitted the input identification value EID is an unauthenticated user.

In various embodiments, the authenticator EAI may have the first value or the second value, which can be a value encrypted based on the public key PUK generated by the client device 100. Accordingly, the authenticator EAI may also be a value encrypted according to a homomorphic encryption algorithm. The authenticator EAI may be a value encrypted using the public key PUK. The authenticator generator 230 may provide the generated authenticator EAI to the arithmetic device 240.

Figure 4:
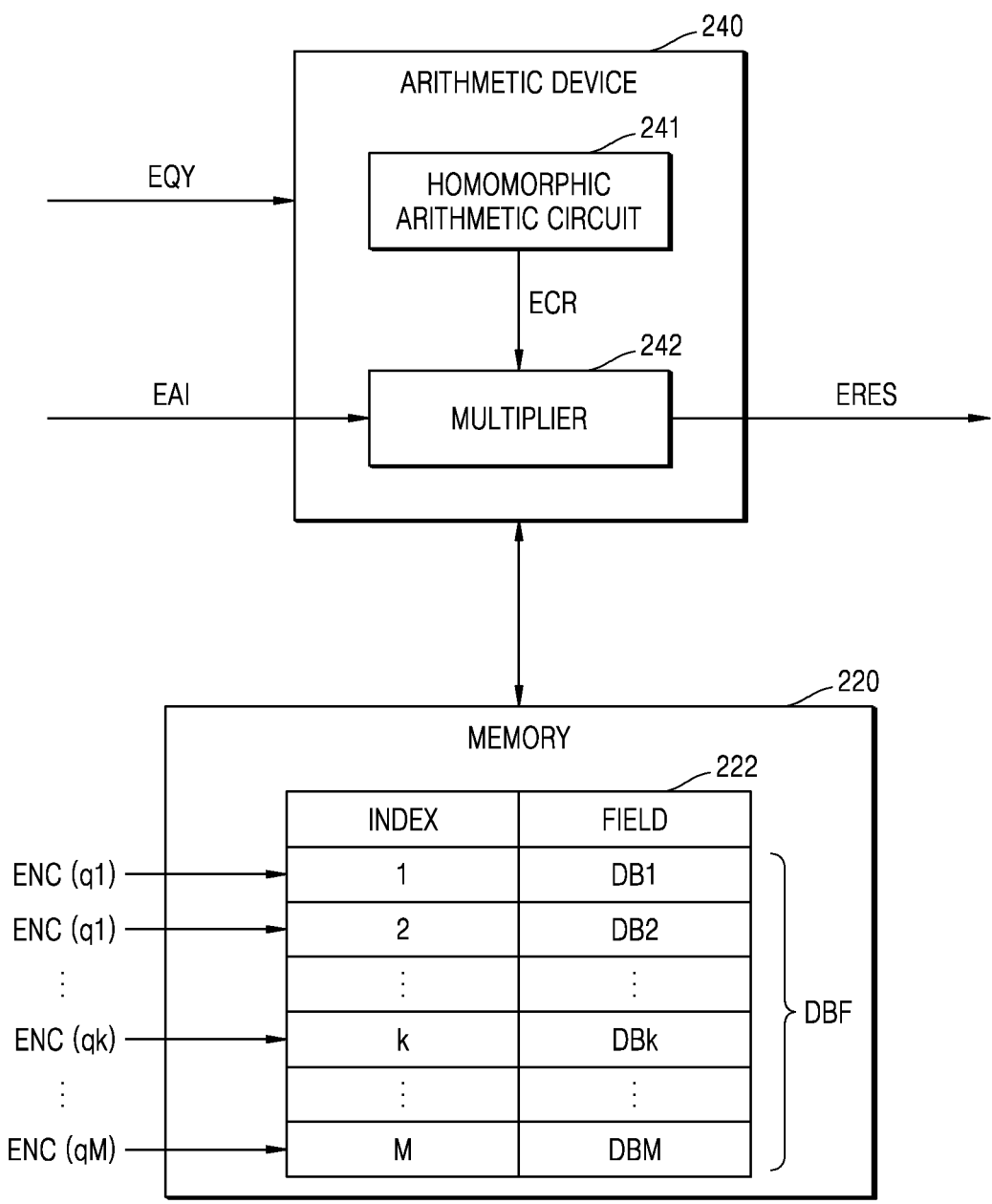
FIG. 4 is a diagram illustrating an operating method of an arithmetic device, according to an embodiment.

FIG. 4 is a diagram illustrating a method of operating an arithmetic device 240 according to an embodiment. FIG. 4 may be described with reference to FIGS. 1 to 3, and redundant descriptions may be omitted.

In various embodiments, the memory 220 may include a second database 222. In an embodiment, the second database 222 may include M records (where M is an integer of 1 or more). Each record may include at least one field. Each record included in the second database 222 may be classified according to an index value. Hereinafter, it may be assumed that each record includes one field. The second database 222 may include the first to M-th field values DB1 to DBM, where each field value may be a value encrypted by a homomorphic encryption algorithm. Each field value may be a value encrypted through different public keys. The first field values DB1 to the M-th field values DBM included in the second database 222 may correspond to the first query ENC(q1) to the M-th query ENC(qM), respectively. For example, when the input query EQY is the first query ENC(q1), the input query EQY may be a query for obtaining the first field value DB1. Similarly, when the input query EQY is the M-th query ENC(qM), the input query EQY may be a query for obtaining the M-th field value DBM. In an embodiment, the first query ENC(q1) to the M-th query ENC(qM)) may be values encrypted according to a homomorphic encryption algorithm. Hereinafter, the input query EQY is assumed to be the same value as the k-th query ENC(qk), which is a query for obtaining the k-th field value (k is an integer of 1 or more) among the field values included in the second database 222.

In various embodiments, the arithmetic device 240 may include a homomorphic arithmetic circuit 241 and a multiplier 242. The arithmetic device 240 may receive the input query EQY from the client device 100. The arithmetic device 240 may receive the authenticator EAI from the authenticator generator 230. The arithmetic device 240 may generate the arithmetic result value ERES based on the input query EQY and the authenticator EAI. The input query EQY may be a value encrypted based on a public key generated by the client device 100.

In an embodiment, the arithmetic device 240 may search the second database 222 in the memory 220 using the input query EQY. The homomorphic arithmetic circuit 241 may perform an operation of comparing the input query EQY with the first query ENC(q1) to the M-th query ENC(qM) to generate a query comparison result value. The comparison operation of the homomorphic arithmetic circuit 241 may be expressed as Equation 7 below.

$$comp(ENC(qk), ENC(qj)) = \begin{cases} ENC(1), & \text{if } qk = qj \\ ENC(0), & \text{if } qk \neq qj \end{cases} \quad \text{[Equation 7]}$$

In various embodiments, the homomorphic arithmetic circuit 241 may obtain first field values DB1 to M-th field values DBM corresponding to the first query ENC(q1) to the M-th query ENC(qM), and may provide the query comparison result value and field value to the multiplier 242.

In various embodiments, the operation of comparing the input query EQY of the homomorphic arithmetic circuit 241 with the first query ENC(q1) to the M-th query ENC(qM) may be performed a total of M times, where a comparison can be made for each of the first query ENC(q1) to M-th query ENC(qM). Therefore, the M query comparison operation result values ECR and the M field values may be provided to the multiplier 242.

In various embodiments, the multiplier 242 may obtain a search result value by multiplying each received query comparison operation result value ECR by a field value corresponding thereto, and adding up each of the multiplied values. This search result value may be expressed as Equation 8 below.

$$H(ENC(qk), DBF)) = \sum_{j=1}^{M} comp(ENC(qk), ENC(qj)) \cdot DBj \quad \text{[Equation 8]}$$

In Equation 8, H (ENC(qk), DBF) may refer to a function that allows the arithmetic device 240 to perform a comparison operation by receiving the k-th query ENC(qk) and field values DBF of the second database 222 as inputs. As used herein, field values DBF may be a term for referring to all of the field values stored in the second database 222, and a jth field value DBj may be a term for referring to a jth field value of the field values DBF, where j is a natural number greater than or equal to 1.

The multiplier 242 may obtain the arithmetic result value by multiplying the search result value obtained through Equation 8 by the authenticator EAI received from the authenticator generator 230. This arithmetic result value may be expressed as Equation 9 below.

$$G(EAI, ENC(qk), DBF) = \quad \text{[Equation 9]}$$

$$\sum_{j=1}^{M} EAI \cdot comp(ENC(qk), ENC(qj)) \cdot DBj$$

In Equation 9, G(EAI, ENC(qk), DBF) may refer to a function that allows the arithmetic device 240 to perform an operation by receiving the authenticator EAI, the k-th query ENC(qk), and field values DBF of the second database 222 as inputs. The arithmetic device 240 may perform the multiplication of the search result value received from the arithmetic circuit 241 through the multiplier 242 with the authenticator EAI received from the authenticator generator 230.

Because the authenticator EAI may have either a first value or a second value depending on whether or not the user of the client device 100 is an authenticated user, Equation 9 may be expressed as Equation 10 below.

$$G(EAI, ENC(qk), DBF) = \begin{cases} ENC(1) \cdot ENC(1) \cdot DBk + \sum_{\substack{j=1 \\ j \neq k}}^{M} \\ \quad ENC(0) \cdot ENC(0) \cdot DBj, & \text{if } k \in M \text{(verified)} \\ ENC(0) \cdot ENC(1) \cdot DBk + \sum_{\substack{j=1 \\ j \neq k}}^{M} \\ \quad ENC(0) \cdot ENC(0) \cdot DBj, & \text{else} \end{cases} \quad \text{[Equation 10]}$$

In an embodiment, the multiplication operation for the first value ENC (1), the second value ENC (0), and the j-th field value DBj among the M field values DBF included in the second database may be calculated as Equations 11 to 15.

$$ENC(0) \cdot ENC(0) = ENC(0) \quad \text{[Equation 11]}$$
$$ENC(1) \cdot ENC(0) = ENC(0) \quad \text{[Equation 12]}$$
$$ENC(1) \cdot ENC(1) = ENC(1) \quad \text{[Equation 13]}$$
$$ENC(0) \cdot DBj = ENC(0) \quad \text{[Equation 14]}$$
$$ENC(1) \cdot DBj = ENC(DBj) \quad \text{[Equation 15]}$$

In an embodiment, the second database 222 may be an unencrypted database, where the field values DBF included in the second database 222 may be unencrypted values, DBj, as referred to in Equation 15. Even though the field values DBF included in the second database 222 are not encrypted, each of the field values DBF may be homomorphic encrypted through a multiplication operation, such as Equation 15.

$$ENC(1) \cdot ENC(DBj) = ENC(DBj) \quad \text{[Equation 16]}$$

In an embodiment, the second database 222 may be an encrypted database. In other words, each field value included in the second database 222 may be an encrypted value, ENC(DBj), as shown in Equation 16. According to Equations 11 to 16, Equation 10 may be represented as Equation 17.

$$G(EAI, ENC(qk), DBF) = ERES = \begin{cases} ENC(DBk), & \text{if verified} \\ ENC(0), & \text{else} \end{cases} \quad \text{[Equation 17]}$$

In various embodiments, the arithmetic device 240 may perform an operation, as shown in Equation 17, and generate the arithmetic result value ERES, where the multiplier 242 may output the arithmetic result value ERES. The arithmetic device 240 may provide the generated arithmetic result value ERES to the client device 100.

In various embodiments, the client device 100 may decrypt the received arithmetic result value ERES using the private key PVK generated by the client device 100. In an embodiment, when the input identification value EID transmitted by the client device 100 exists in the first database 221, the client device 100 may be an authenticated device, where the user of the client device 100 may be an authenticated user. When the authenticated client device 100 decrypts the arithmetic result value ERES by using the private key PVK, the decrypted result may be the k-th field value DBk stored in the second database 222, where k is an index value of 1 to M.

In an embodiment, when the input identification value EID transmitted by the client device 100 does not exist in the first database 221, the client device 100 may be an unauthenticated device, where the user of the client device 100 may be an unauthenticated user. When the unauthenticated client device 100 decrypts the arithmetic result value ERES by using a private key PVK, the decrypted result may be a dummy value. For example, the dummy value may be 0, NULL, or a garbage value. The dummy value may be a value independent of a plurality of field values DBF stored in the first database 221 and the second database 222. The decryption result may be a value corresponding to a query provided by the client device 100 or a dummy value not related to the query provided by the client device 100.

Through the operating method of the homomorphic encryption arithmetic device of the present disclosure described above, the authenticated client device 100 may obtain a value corresponding to an input query EQY transmitted by the client device 100 by decrypting the arithmetic result value ERES obtained from the server device 200, where the arithmetic device 240 may generate the arithmetic result value ERES. The unauthenticated client device 100 may obtain a value unrelated to the input query EQY transmitted by the client device 100 by decrypting the arithmetic result value ERES obtained from the server device 200. The operating method of the homomorphic encryption arithmetic device of the present disclosure may be referred to as a blind authentication protocol. A system that operates on the basis of this anonymous authentication protocol may have resistance to Man In the Middle Attack.

Figure 5:
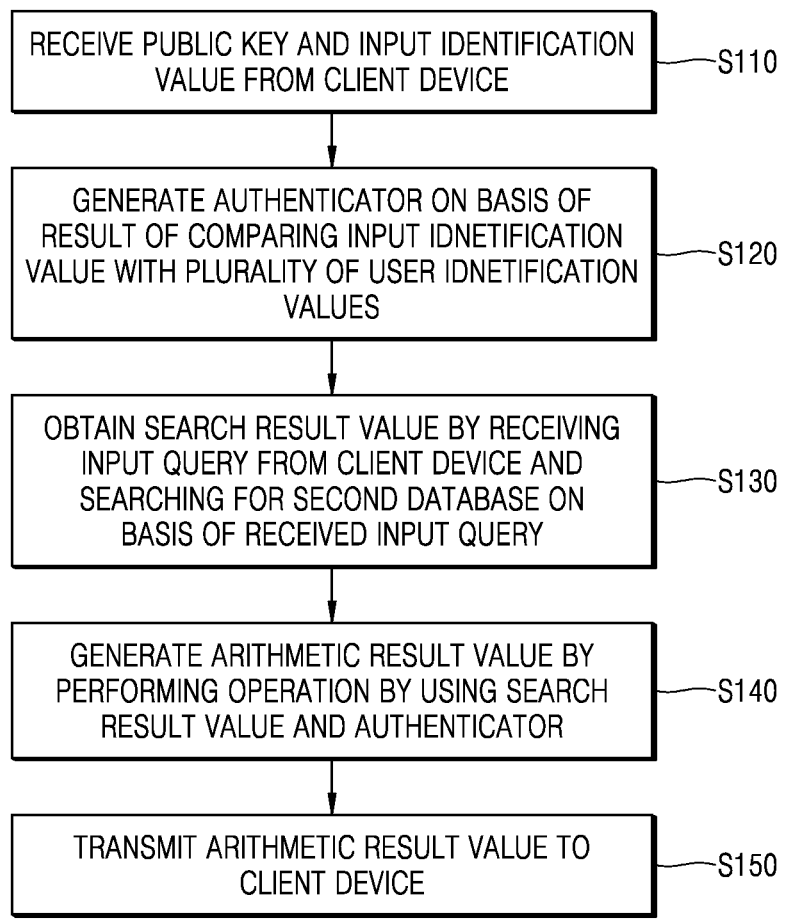
FIG. 5 is a flowchart illustrating an operating method of a server device, according to an embodiment.

FIG. 5 is a flowchart illustrating a method of operating a server device 200 according to an embodiment. FIG. 5 may be described with reference to FIGS. 1 and 2, and redundant descriptions may be omitted.

Referring to FIG. 5, in operation S110, the server device 200 may receive a public key PUK and an input identification value EID from the client device 100. The input identification value EID may be a value encrypted by a homomorphic encryption algorithm.

In an embodiment, the server device 200 may receive an evaluation key EVK used for homomorphic encryption operation. That is, the server device 200 may receive a public key PUK, an evaluation key EVK, and an input identification value EID from the client device 100.

In operation S120, the server device 200 may generate an authenticator EAI based on a result of comparing the input identification value EID with a plurality of user identification values, where the server device 200 may search for a plurality of user identification values stored in the first database 221. The user identification values stored in the first database 221 may be stored in an encrypted form by a homomorphic encryption algorithm. The server device 200 may compare the input identification value EID with the plurality of user identification values found from the first database 221. The server device 200 may generate the authenticator EAI, based on the comparison result.

In an embodiment, the server device 200 may generate an authenticator EAI by performing an operation of comparing the input identification value EID with the plurality of user identification values stored in the first database 221, based on the evaluation key EVK. A detailed description of operation S120 will be described later in FIG. 6.

In operation S130, the server device 200 may receive an input query EQY from the client device 100. The server device 200 may obtain a search result value by searching the second database 222 based on the input query EQY.

Specifically, the server device 200 may perform an operation of comparing the input query EQY received from the client device 100 with the queries ENC(q1) to ENC(qM) corresponding to the field values stored in the second database 222, and obtain comparison operation results ECR. The server device 200 may obtain a search result value by multiplying each comparison operation result value ECR by the field value DBF corresponding to each of the comparison operation result values ECR.

In an embodiment, the server device 200 may perform an operation of comparing the input query EQY with encrypted queries corresponding to the field values DBF included in the second database 222, based on the evaluation key EVK.

In an embodiment, the server device 200 may multiply each of the comparison operation result values ECR by the field values DBF corresponding to each of the comparison operation result values ECR, based on the evaluation key EVK. A detailed description of operation S130 will be described later in FIG. 7.

In operation S140, the server device 200 may generate an arithmetic result value ERES by performing an operation using a search result value and an authenticator EAI, where the server device 200 may obtain the arithmetic result value ERES by multiplying the search result value by the authenticator EAI based on the input identification value EID.

In an embodiment, when the authenticator EAI has a first value, the server device 200 may multiply the first value by the search result value, and the server device 200 may output the search result value as the arithmetic result value ERES.

In an embodiment, when the authenticator EAI has a second value, the server device 200 may multiply the second value by the search result value, and the server device 200 may output the dummy value as the arithmetic result value ERES.

In an embodiment, the server device 200 may perform an operation of multiplying the search result values by the authenticator EAI, based on the evaluation key EVK.

In operation S150, the server device 200 may provide the arithmetic result value ERES to the client device 100. The client device 100 may decrypt the arithmetic result value ERES received from the server device 200 using the private key PVK.

In an embodiment, when the authenticator EAI has a first value, the result of decrypting the arithmetic result value ERES may include a field value corresponding to the input query EQY among the values stored in the second database 222.

In an embodiment, when the authenticator EAI has a second value, a result of decrypting the arithmetic result value ERES may be a dummy value.

Figure 6:
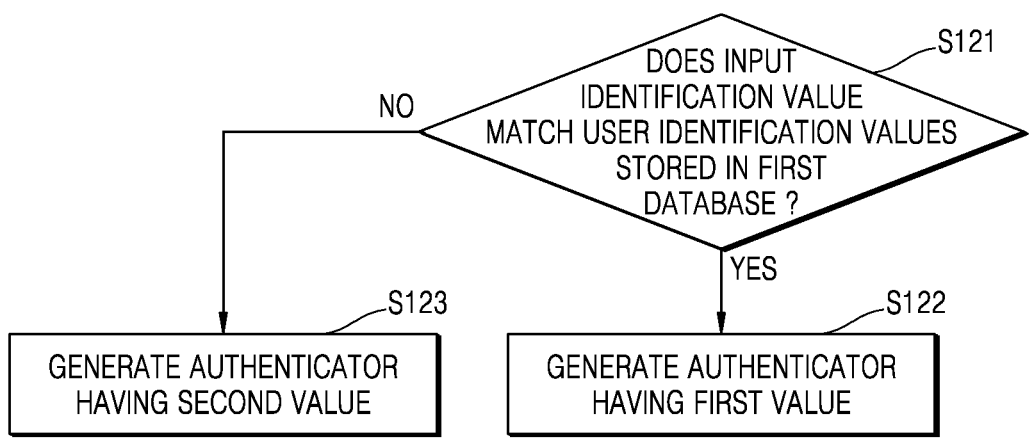
FIG. 6 is a diagram illustrating an operating method of a server device, according to another embodiment.

FIG. 6 is a diagram illustrating a method of operating a server device 200 according to another embodiment. Specifically, FIG. 6 is a diagram for describing operation S120 of FIG. 5. FIG. 6 may be described with reference to FIGS. 1, 2, and 5, and redundant descriptions may be omitted.

Referring to FIG. 6, in operation S121, the server device 200 may determine whether there is a match between the input identification value EID and the user identification values stored in the first database 221.

In operation S122, when the input identification value EID matches at least one of the user identification values stored in the first database 221, the server device 200 may generate an authenticator EAI having a first value. In other words, the server device 200 may generate an authenticator EAI having a first value in response to the input identification value EID matching at least one of the plurality of user identification values stored in the first database 221.

In operation S123, when the input identification value EID does not have a matching user identification value among the user identification values stored in the first database 221, the server device 200 may generate an authenticator EAI having a second value. The server device 200 may generate an authenticator EAI having a second value in response to the input identification value EID matching none of the plurality of user identification values stored in the first database 221. The authenticator EAI can have the second value, in response to the input identification value mismatching the plurality of user identification values stored in the first database.

Figure 7:
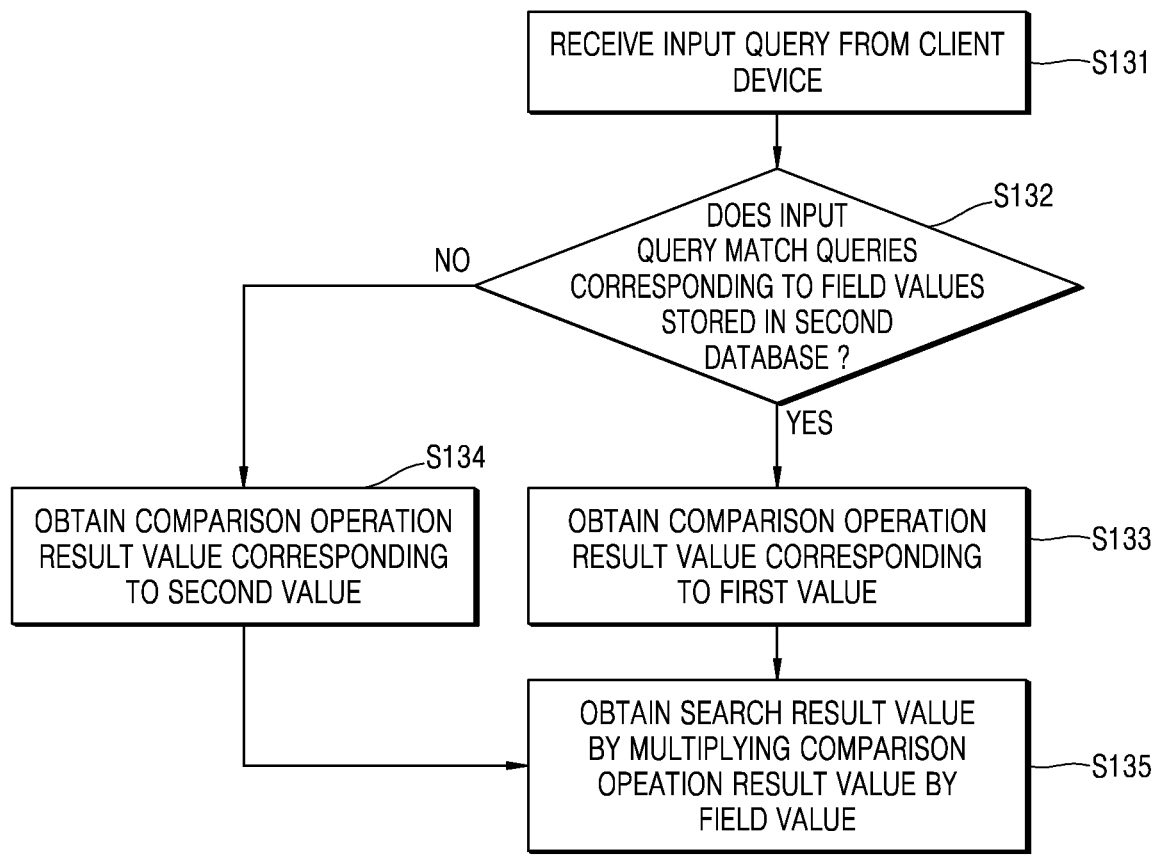
FIG. 7 is a diagram illustrating an operating method of a server device, according to another embodiment.

FIG. 7 is a diagram illustrating a method of operating a server device 200 according to another embodiment. Specifically, FIG. 7 is a diagram for describing operation S130 of FIG. 5. FIG. 7 may be described with reference to FIGS. 1, 2, and 5, and redundant descriptions may be omitted.

Referring to FIG. 7, in operation S131, the server device 200 may receive an input query EQY from the client device 100. In an embodiment, the input query EQY may be encrypted based on a homomorphic encryption algorithm, where the input query EQY may be encrypted based on the public key PUK.

In operation S132, the server device 200 may determine whether there is a match between the input query EQY and queries corresponding to each of the field values stored in the second database 222. Specifically, an operation of comparing the input query EQY with encrypted queries corresponding to field values included in the second database 222 may be performed. The server device 200 may perform an operation of comparing the input query EQY received from the client device 100 with the queries corresponding to the field values stored in the second database 222.

In an embodiment, in comparison with an input query EQY, the queries to be compared may be queries encrypted based on a homomorphic encryption algorithm.

In operation S133, in response to a determination that at least one matching query exists, as a result of the comparison in operation S132, the server device 200 may determine the first value as a comparison operation result value. The server device 200 may obtain a comparison operation result value corresponding to the first value by performing the comparison operation in operation S132.

In operation S134, in response to a determination that there is no matching query, as a result of the comparison in operation S132, the server device 200 may determine the second value as the result of the comparison operation result value. The server device 200 may obtain a comparison operation result value corresponding to second value by performing the comparison operation in operation S132.

In operation S135, the server device 200 may obtain a search result value by multiplying the comparison operation result value by the field value. In an embodiment, when the number of field values stored in the second database is M, the number of comparison operation result values may also be M. The number of values obtained by multiplying each of the M comparison operation result values by a field value corresponding thereto may also be M. In an embodiment, the search result value may be a value obtained by summing all of the M multiplied values.

Figure 8:
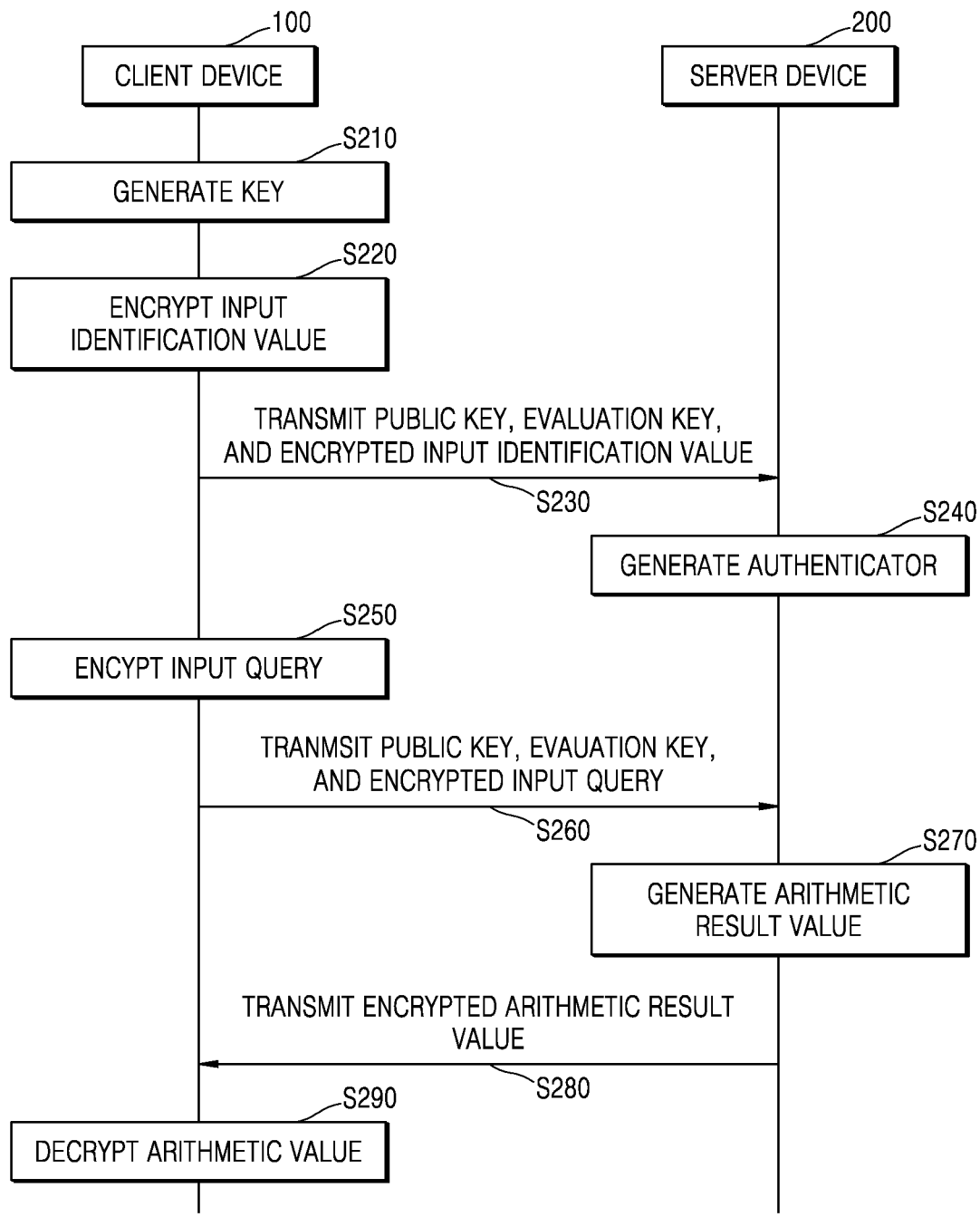
FIG. 8 is a diagram illustrating an operating method of a client device and a server device, according to an embodiment.

FIG. 8 is a diagram illustrating a method of operating a client device 100 and a server device 200 according to an embodiment. FIG. 8 may be described with reference to FIGS. 1 and 2, and redundant descriptions may be omitted.

Referring to FIG. 8, in operation S210, the client device 100 may generate a public key PUK, a private key PVK, and an evaluation key EVK. Keys generated by the client device 100 may be generated according to a homomorphic encryption algorithm.

In operation S220, the client device 100 may encrypt the input identification value EID according to the homomorphic encryption algorithm. In an embodiment, the input identification value EID may be encrypted using the public key PUK.

In operation S230, the client device 100 may transmit the public key PUK, the evaluation key EVK, and the encrypted input identification value EID to the server device 200. The server device 200 can receive the public key and the input identification value encrypted based on the public key from the client 100.

In operation S240, the server device 200 may compare the received input identification value EID with the user identification values stored in the first database 221, and generate an authenticator EAI based on the comparison result.

In operation S250, the client device 100 may encrypt the input query EQY. In an embodiment, the input query EQY may be encrypted using the public key PUK.

In operation S260, the client device 100 may transmit the public key PUK, the evaluation key EVK, and the encrypted input query EQY to the server device 200. In an embodiment, since the public key PUK and the evaluation key EVK were transmitted to the server device 200 in operation S230, only the input query EQY may be transmitted to the server device 200 in operation S260.

In operation S270, the server device 200 may obtain a search result value by searching the second database 222 based on the input query EQY. The server device 200 may generate an arithmetic result value ERES by performing an operation using the search result value and the authenticator EAI.

In operation S280, the server device 200 may transmit the arithmetic result value ERES to the client device 100. In an embodiment, the arithmetic result value ERES may be a value encrypted using the public key PUK.

In operation S290, the client device 100 may decrypt the arithmetic result value ERES. Specifically, the client device 100 may decrypt the arithmetic result value ERES using the private key PVK.

According to an embodiment of the present disclosure, the operation of transmitting, to the client device 100 by the server device 200, the result of verifying the input identification value EID received from the client device 100 may be omitted. The server device 200 may perform an operation using an authenticator EAI without transmitting the verification result to the client device 100. Therefore, according to the operating method of the homomorphic encryption arithmetic device, the authentication stage of authenticating the user can be reduced, so the communication process between the client device 100 and the server device 200 may be reduced, and the overhead of the computing resources required for communication may be reduced.

Figure 9:
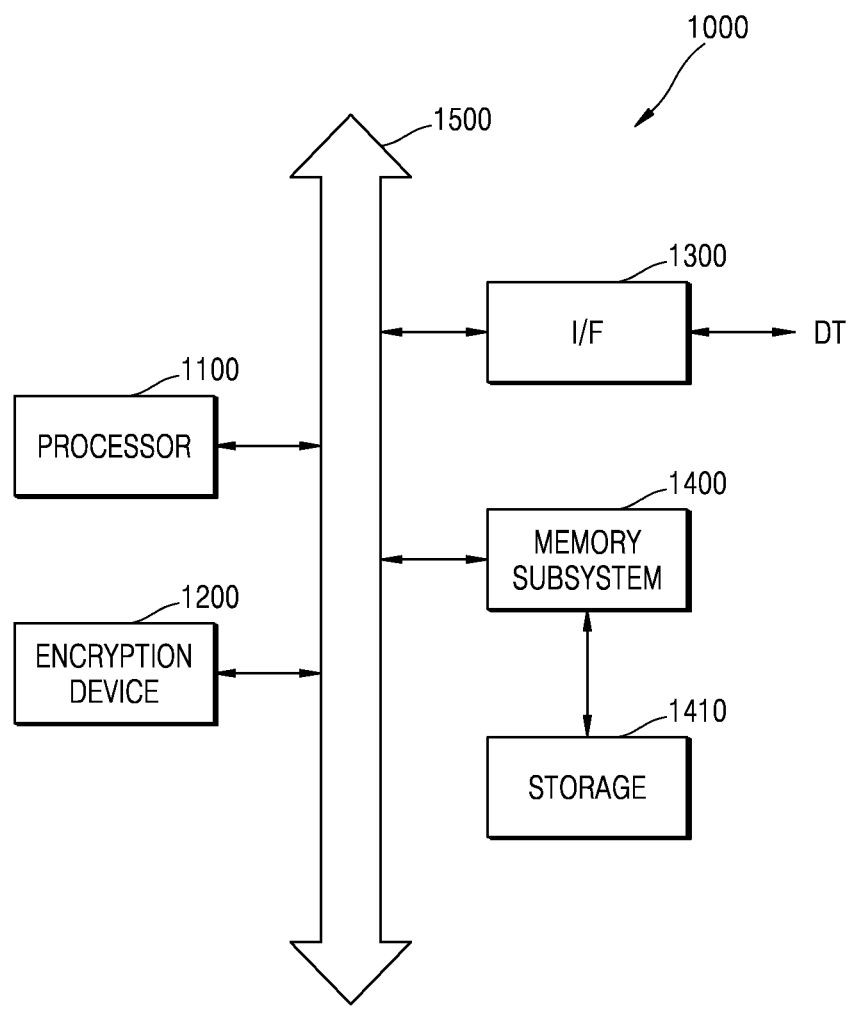
FIG. 9 is a block diagram illustrating an electronic device according to an embodiment.

FIG. 9 is a block diagram illustrating an electronic device 1000 according to an embodiment.

In various embodiments, the electronic device 1000 may include a processor 1100, an encryption device 1200, an interface 1300, a memory subsystem 1400, a storage 1410, and a bus 1500. The electronic device 1000 of FIG. 9 may correspond to the client device 100 and/or the server device 200. Components included in the electronic device 1000 may communicate with each other through the bus 1500.

In various embodiments, the electronic device 1000 may be implemented as various electronic devices or may be included in various electronic devices. For example, electronic devices may include drones, robotic devices such as Advanced Drivers Assistance Systems (ADAS), smart TVs, smartphones, medical devices, mobile devices, video display devices, instrumentation devices, Internet of Things (IoT) devices, and the like.

In various embodiments, the electronic device 1000 may be a system-on-chip (SoC) in which components are implemented in one chip, and the storage 1410 may be external to the system-on-chip. In various embodiments, at least one of the components illustrated in FIG. 9 may be omitted from the electronic device 1000.

In various embodiments, the processor 1100 may control the operation of the electronic device 1000 at the top layer and may control other components of the electronic device 1000. The processor 1100 may communicate with the memory subsystem 1400 and execute instructions. In various embodiments, the processor 1100 may execute a program stored in the memory subsystem 1400. The program may include a series of instructions stored in the memory subsystem 1400. The processor 1100 may be hardware capable of independently executing instructions, and may be referred to as an Application Processor (AP), a Communication Processor (CP), a Central Processing Unit (CPU), a processor core, a core, and the like. The processor 1100 may execute a method of operating the homomorphic encryption arithmetic device according to the inventive concept.

In various embodiments, the encryption device 1200 may encrypt and/or decrypt data DT received from the outside of the electronic device 1000. The encryption device 1200 may maintain the security of data DT by performing an encryption operation based on an encryption algorithm. The encryption algorithm may be, for example, an algorithm that generates encrypted data using an encryption key. In various embodiments, the encryption algorithm may be a homomorphic encryption algorithm, where operations may be performed on the data DT encrypted using the homomorphic encryption algorithm, while maintaining the security of data DT.

In various embodiments, the interface 1300 may provide an interface for obtaining an input from the outside of the electronic device 1000 and providing an output to the outside of the electronic device 1000. In an embodiment, the electronic device 1000 may transmit and receive data DT to and from the outside of the electronic device 1000, where for example, the electronic device 1000 may transmit and receive data DT to and from a smart card, a memory card, or other device.

In various embodiments, the memory subsystem 1400 may be accessed by other components connected to the bus 1500. In some embodiments, the memory subsystem 1400 may include volatile memory such as DRAM and SRAM, or nonvolatile memory such as flash memory and resistive random access memory (RRAM). In various embodiments, the memory subsystem 1400 may provide an interface to the storage 1410. The storage 1410 may be a storage medium that does not lose data even when power is cut off. For example, the storage 1410 may include a semiconductor memory device, such as a non-volatile memory, and may include a storage medium, such as a magnetic card/disk or optical card/disk. A task analysis method according to an embodiment of the present disclosure may be stored in the memory subsystem 1400 and/or the storage 1410.

In various embodiments, the memory subsystem 1400 may be accessed by the processor 1100 and may store software elements executable by the processor 1100. The software element may include, by way of a non-limiting example, a software component, program, application, computer program, application program, system program, software development program, machine program, operating system (OS) software, middleware, firmware, software module, routine, subroutine, function, method, procedure, software interface, application program interface (API), instruction set, computing code, computer code, code segment, computer code segment, word, value, symbol, or any combination of two or more thereof.

In various embodiments, the bus 1500 may operate based on one of various bus protocols, where the various bus protocols may include at least one of an Advanced Microcontroller Bus Architecture (AMBA) protocol, a Universal Serial Bus (USB) protocol, a MultiMedia Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, a Mobile Industry Processor Interface (MIPI) protocol, a Universal Flash Storage (UFS) protocol, etc.

Figure 10:
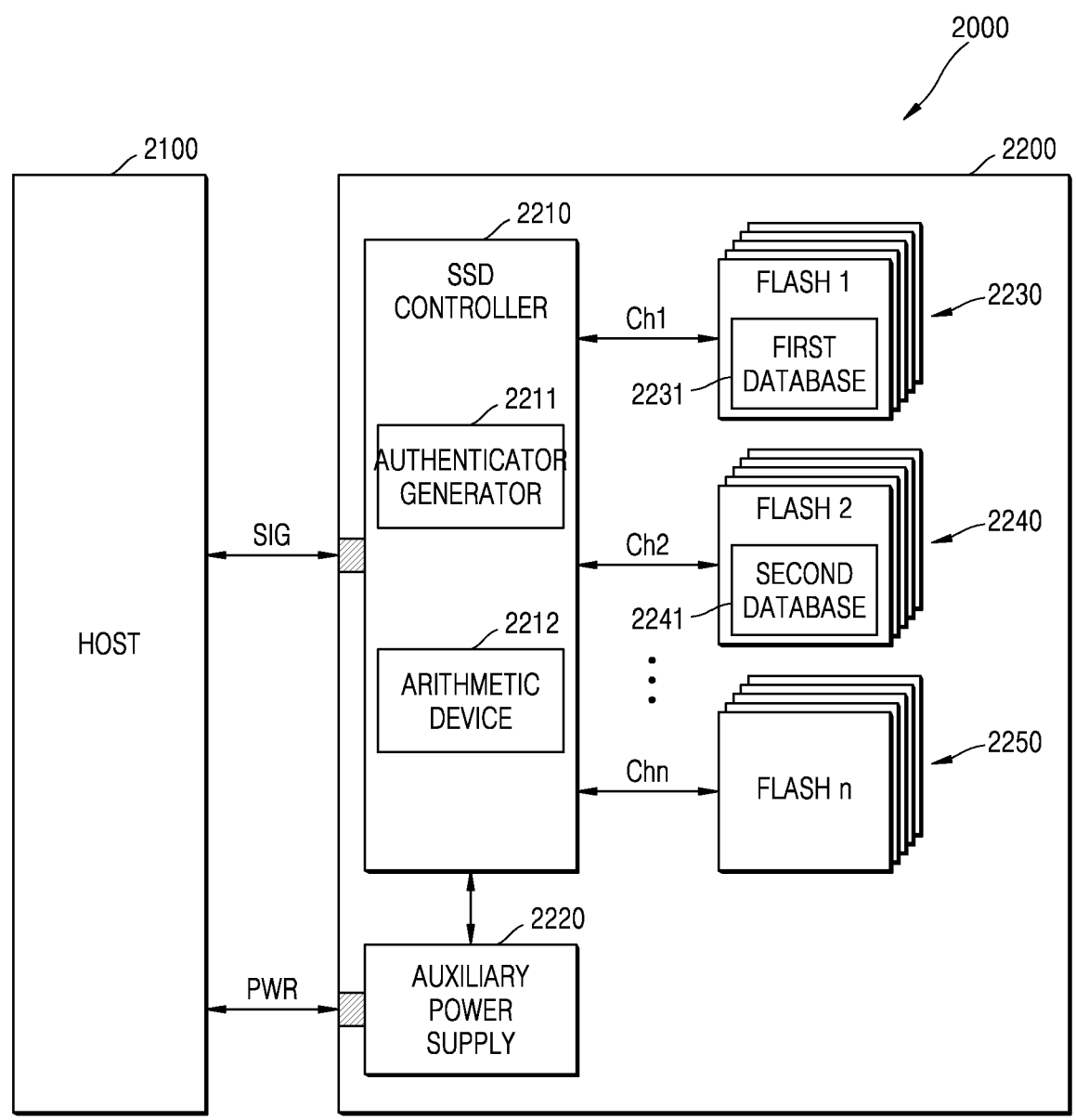
FIG. 10 is a block diagram illustrating a solid state drive (SSD) system according to an embodiment.

FIG. 10 is a block diagram illustrating a solid state drive (SSD) system 2000 according to an embodiment.

In various embodiments, the SSD system 2000 may include a host 2100 and an SSD 2200. The SSD 2200 may transmit and receive signals SIG to and from the host 2100 through a signal connector, and may receive power PWR through a power connector. The SSD 2200 may include an SSD controller 2210, an auxiliary power supply 2220, and a plurality of flash memory devices 2230, 2240, and 2250. The SSD controller 2210 may communicate with the plurality of flash memory devices through a first channel Ch1 to an n-th channel Cn (n is an integer of 1 or more).

In various embodiments, the flash memory devices 2230, 2240, and 2250 may include a first database 2231 and a second database 2241. The first database 2231 may correspond to the first database 221 illustrated in FIG. 2, and the second database 2241 may correspond to the second database 222 illustrated in FIG. 2.

In various embodiments, the SSD controller 2210 may include an authenticator generator 2211 and an arithmetic device 2212. The authenticator generator 2211 and the arithmetic device 2212 may be implemented according to the embodiments illustrated in FIGS. 1 to 9.

While the inventive concept has been particularly shown and described with reference to embodiments thereof, it will be understood that various changes in form and details may be made therein without departing from the spirit and scope of the following claims.

What is claimed is:

1. An operating method of a homomorphic encryption arithmetic device, the operating method comprising:
    receiving, from a client, a public key and an input identification value encrypted based on the public key;
    generating an authenticator on the basis of a result of comparing the input identification value with a plurality of user identification values;
    obtaining a search result value on the basis of an input query received from the client;
    generating an arithmetic result value using the search result value and the authenticator; and
    transmitting the arithmetic result value to a client.

2. The method of claim 1, wherein the generating of the authenticator comprises:
    generating the authenticator having a first value, in response to the input identification value matching at least one of the plurality of user identification values stored in a first database; and
    generating the authenticator having a second value, in response to the input identification value mismatching the plurality of user identification values stored in the first database.

3. The method of claim 2, wherein the generating of the arithmetic result value comprises:
    multiplying the search result value by the authenticator, wherein
    the arithmetic result value is assigned the search result value, in response to the authenticator having the first value; and
    the arithmetic result value is assigned a dummy value, in response to the authenticator having the second value.

4. The method of claim 2, wherein the generating of the arithmetic result value comprises:
    in response to the authenticator having the first value, generating the arithmetic result value including a field value corresponding to the input query during decryption by using a private key corresponding to the public key; and
    in response to the authenticator having the second value, generating the arithmetic result value having a dummy value during decryption by using the private key.

5. The method of claim 1, wherein the input query is encrypted based on the public key.

6. The method of claim 5, wherein the a search result value is obtained by searching a second database, wherein the searching comprises:
    obtaining comparison operation result values by performing an operation of comparing the input query with encrypted queries corresponding to field values included in the second database;
    obtaining the search result value by multiplying the comparison operation result values by the field values respectively corresponding to the comparison operation result values; and
    obtaining the arithmetic result value by multiplying the search result value by the authenticator.

7. The method of claim 1, wherein the receiving of the encrypted input identification value comprises:
    receiving an evaluation key from the client; and
    generating the authenticator by comparing the input identification value with the plurality of user identification values stored in the first database, based on the evaluation key.

8. The method of claim 1, wherein the obtaining of the search result value comprises
    receiving an evaluation key from the client, and searching a second database, wherein
    the searching of the second database comprises:
    obtaining comparison operation result values by comparing the input query with encrypted queries corresponding to field values included in the second database, based on the evaluation key;
    multiplying the comparison operation result values by the field values corresponding to the comparison operation result values, respectively, based on the evaluation key; and multiplying the search result value by the authenticator, based on the evaluation key.

9. A homomorphic encryption arithmetic device comprising:
a memory including a first database and a second database, wherein the first database is configured to store a plurality of user identification values, and the second database is configured to store a plurality of field values;
an authenticator generator configured to receive, a public key and an input identification value encrypted based on the public key, and configured to generate an authenticator based on a result of comparing the input identification value with the plurality of user identification values; and
an arithmetic device configured to obtain a search result value by searching the second database on the basis of an input query, obtain an arithmetic result value by performing an operation using the search result value and the authenticator, and transmit the arithmetic result value to a client.

10. The homomorphic encryption arithmetic device of claim 9, wherein the authenticator generator is configured to:
generate the authenticator having a first value, in response to the input identification value matching at least one of the plurality of user identification values stored in the first database; and
generate the authenticator having a second value, in response to the input identification value mismatching the plurality of user identification values stored in the first database.

11. The homomorphic encryption arithmetic device of claim 10, wherein the arithmetic device is configured to:
generate the arithmetic result value having the search result value, when the first value is multiplied by the search result value; and
generate the arithmetic result value having a dummy value, when the second value is multiplied by the search result value.

12. The homomorphic encryption arithmetic device of claim 10, wherein the arithmetic device is configured to:
generate the arithmetic result value including a field value corresponding to the input query during decryption by using a private key corresponding to the public key in response to the authenticator having the first value; and
generate the arithmetic result having a dummy value during decryption by using the private key in response to the authenticator having the second value.

13. The homomorphic encryption arithmetic device of claim 9, wherein the input query is encrypted based on the public key.

14. The homomorphic encryption arithmetic device of claim 13, wherein the arithmetic device is configured to:
obtain comparison operation result values by comparing the input query with encrypted queries corresponding to field values included in the second database;
obtain the search result value by multiplying the comparison operation result values by the field values respectively corresponding to the comparison operation result values; and
obtain the arithmetic result value by multiplying the search result value by the authenticator.

15. The homomorphic encryption arithmetic device of claim 9, wherein the authenticator generator is configured to:
receive an evaluation key from the client; and
generate the authenticator by comparing the input identification value with the plurality of user identification values stored in the first database, based on the evaluation key.

16. The homomorphic encryption arithmetic device of claim 9, wherein the arithmetic device is configured to:
receive an evaluation key from the client; and
obtain comparison operation result values by comparing the input query with encrypted queries corresponding to field values included in the second database, based on the evaluation key;
multiply the comparison operation result values by the field values respectively corresponding to the comparison operation result values, based on the evaluation key; and
multiply the search result value by the authenticator, based on the evaluation key.

17. A non-transitory computer-readable storage medium storing commands that cause a processor to perform homomorphic encryption operations when executed by the processor, the processor configured to:
receive, from a client, a public key and an input identification value encrypted based on the public key;
generate an authenticator on the basis of a result of comparing an input identification value with a plurality of user identification values stored in a first database;
obtain a search result value by searching a second database on the basis of an input query received from the client;
generate an arithmetic result value by performing an operation by using the search result value and the authenticator; and
transmit the arithmetic result value to the client.

18. The non-transitory computer-readable storage medium of claim 17, wherein the generating of the authenticator comprises:
generating the authenticator having a first value, in response to the input identification value matching at least one of the plurality of user identification values stored in the first database; and
generating the authenticator having a second value, in response to the input identification value mismatching the plurality of user identification values stored in the first database.

19. The non-transitory computer-readable storage medium of claim 18, wherein the generating of the arithmetic result value comprises:
generating the arithmetic result value including a field value corresponding to the input query during decryption by using a private key corresponding to the public key in response to the authenticator having the first value; and
generating the arithmetic result value having a dummy value during decryption by using the private key in response to the authenticator having the second value.

20. The non-transitory computer-readable storage medium of claim 17, wherein the searching of the second database comprises:
obtaining comparison operation result values by performing an operation of comparing the input query with encrypted queries corresponding to field values included in the second database;
obtaining the search result value by multiplying the comparison operation result values by the field values respectively corresponding to the comparison operation result values; and obtaining the arithmetic result by multiplying the search result value by the authenticator.

\* \* \* \* \*